United States Patent [19]
Goswami et al.

[11] Patent Number: 5,694,515
[45] Date of Patent: Dec. 2, 1997

[54] CONTACT RESISTANCE-REGULATED STORAGE HEATER FOR FLUIDS

[75] Inventors: D. Yogi Goswami; Chung K. Hsieh; Chand K. Jotshi; James F. Klausner, all of Gainsville, Fla.

[73] Assignee: The University of Florida, Gainsville, Fla.

[21] Appl. No.: 370,265

[22] Filed: Jan. 9, 1995

[51] Int. Cl.$^6$ .................................. F24H 1/10; F28F 21/00
[52] U.S. Cl. ........................ 392/480; 392/341; 392/482; 165/180; 137/341
[58] Field of Search .................. 392/479–480, 392/482–484, 341; 137/341; 165/168–169, 180, 185, 81; 285/905

[56] References Cited

U.S. PATENT DOCUMENTS

| | | | |
|---|---|---|---|
| 703,970 | 7/1902 | Quain | 392/480 |
| 860,179 | 7/1907 | Abbot | 392/480 |
| 1,069,372 | 8/1913 | Bell . | |
| 1,069,374 | 8/1913 | Bell et al. . | |
| 1,369,900 | 3/1921 | Macy | 392/480 |
| 2,673,920 | 3/1954 | Donovan et al. | 392/484 |
| 2,852,232 | 9/1958 | Marwell | 165/168 |
| 2,866,885 | 12/1958 | McIlrath | 392/484 |
| 2,911,513 | 11/1959 | MacCracken . | |
| 3,225,820 | 12/1965 | Riordan . | |
| 3,381,113 | 4/1968 | Jacques et al. . | |
| 3,390,717 | 7/1968 | Townsend . | |
| 3,624,356 | 11/1971 | Havill . | |
| 3,721,101 | 3/1973 | Sheppard et al. . | |
| 3,721,102 | 3/1973 | Green . | |
| 3,773,031 | 11/1973 | Laing et al. . | |
| 4,212,346 | 7/1980 | Boyd . | |
| 4,246,466 | 1/1981 | Rice et al. . | |
| 4,395,620 | 7/1983 | Clyde et al. . | |
| 4,508,101 | 4/1985 | Carter et al. . | |
| 4,587,404 | 5/1986 | Smith . | |
| 4,714,821 | 12/1987 | Jakobsson . | |
| 4,772,777 | 9/1988 | Weller et al. . | |
| 4,807,696 | 2/1989 | Colvin et al. . | |
| 4,852,645 | 8/1989 | Coulon et al. | 165/180 |
| 4,885,915 | 12/1989 | Jakobsson . | |
| 5,069,199 | 12/1991 | Messner . | |

FOREIGN PATENT DOCUMENTS

| | | |
|---|---|---|
| 0174694 | 10/1982 | Japan . |
| 0203111 | 12/1982 | Japan . |
| 0076911 | 5/1983 | Japan . |
| 0304000 | 12/1990 | Japan . |
| 0666521 | 6/1979 | U.S.S.R. . |

*Primary Examiner*—Teresa J. Walberg
*Assistant Examiner*—Raphael Valencia
*Attorney, Agent, or Firm*—Needle & Rosenberg, P.C.

[57] ABSTRACT

A storage fluid heater for heating a fluid, employs a heat storage unit, a heating element thermally coupled to the heat storage unit, and a heat recovery tube thermally coupled to the heat storage unit. The recovery tube is made from a material having a coefficient of thermal expansion so that as the average temperature of the heat storage unit near the heat recovery tube increases, the surface area of gaps between the heat recovery tube and the storage unit increases, causing the contact resistance between the heat storage unit and the heat recovery tube to increase. The temperature of the fluid flowing within the heat recovery tube is thereby limited to a predetermined maximum. A structure that relieves excess pressure when the flow of fluid through the tube is stopped has an expansion tank connected to the fluid inlet of the tube.

18 Claims, 2 Drawing Sheets

CONTACT RESISTANCE-REGULATED STORAGE HEATER FOR FLUIDS

FIELD OF THE INVENTION

The present invention relates to a storage fluid heater and, more particularly, to a heater designed to store heat and, at a later time, transfer the stored heat to a fluid (such as water) for later use via a controlled heat transfer.

DESCRIPTION OF THE PRIOR ART

Storage heaters have long been used to store heat during periods when energy is inexpensive or readily available and recover heat for use at a later time when energy is more expensive or less available. Such heaters can be used to store heat in residential applications, such as in water heaters, and in industrial applications, such as in bulk liquid heaters used in the chemical industry. Typically, a storage heater has some sort of heat storage means, which is heated to a relatively high temperature, and a heat recovery means, which carries the stored heat away as it is used. During use, heat is transferred from the storage means to the recovery means via some system of controlled heat transfer.

Several disclosures teach controlled heat transfer from a heat storage unit. For example, Jakobsson (U.S. Pat. No. 4,714,821, see also U.S. Pat. No. 4,885,915) discloses a heat storage unit having a body of material with high heat capacity, such as cast iron, heated by electrical energy with a tube for passage of water through the heat storage body to heat the water. A variable speed pump is used to pump water through sufficiently rapidly to prevent boiling of the water when the thermal mass is at a high temperature. The speed of the pump controls the rate of heat transfer.

Bell (U.S. Pat. No. 1,069,372) discloses a heat storage apparatus including a thermal mass, such as cast iron, that is electrically heated and includes a water coil extending about that mass for transferring heat from the mass to water flowing through that coil.

Welter et al. (U.S. Pat. No. 4,772,777) discloses a heating unit in which the material to be heated is moved toward or away from a heating element to maintain the temperature of the liquid in that container at a constant optimal value and to prevent boiling.

Several methods of controlling heat transfer are also disclosed. Sasaki (Japanese Patent No. JA 203111) discloses a controller for heat dissipation comprising a case having a double cylindrical shape consisting of an outer bellows and an inner bellows, and an adjusting spring at a space in the inner cylinder. When heat is dissipated from the apparatus onto a substrate, a hydraulic fluid inside the case is heated, pressure inside the case is increased, and the bellows expands, pressing a contact plate into contact with a radiator, which thereby dissipates heat. When the apparatus has cooled, the pressure inside the case is decreased, the bellows contracts, and the contact plate is separated from the radiator, thereby stopping the heat dissipation.

Boyd (U.S. Pat. No. 4,212,346) discloses a variable heat transfer device, or thermal switch, that can vary its thermal resistance in response to changes in the temperature of either of two bodies in contact with the switch. A thermal switch contacts a first heat station and a second heat station. The first of the heat stations is a heat source, while the second is a heat sink. The thermal switch is filled with a heat expandable material that serves as an actuator. When the temperature of one heat station rises, the actuator expands against a piston in a chamber of the thermal switch. A thermally conducting strip is connected to one of the heat stations and in thermal contact with the other. The pressure of the piston against the strip causes a decrease in thermal resistance of the contact.

Blinchevskii (Soviet Certificate No. SU 666521) discloses a device for stabilizing temperature suitable for radio equipment and other uses. A two phase substance (solid/liquid and/or gas) conditionally flows between small reservoirs and a narrow separating gap between an object and the surface of the subject heat exchanger. Concentric undercuts in the object and the separating gap serve as the reservoirs, with a capillary-porous agent as a filler. The thermal resistance between the two bodies is automatically regulated by the migration of the agent in the reservoirs between the first and the second reservoirs in the gap.

Murase (Japanese Patent No. JA 304000) discloses a device used for performing a heat exchange between two spaced-apart objects. The resistance is changed by changing the volume occupied by a heat transfer material in a cylindrical member. The cylindrical member comprises a material having low thermal conductivity, and includes a means for changing the thermal conductivity. Each of the two spaced-apart objects is attached to the ends of the cylindrical member. A member having high thermal conductivity is disposed inside the cylindrical member. By changing the volume occupied by the high thermal conductivity member in the axial direction, the thermal resistance between the first and second spaced-apart objects can be controlled.

McCracken et al. (U.S. Pat. No. 2,911,513) discloses a water heater wherein heat is stored in an accumulator for transfer to the water as needed. An intermediate heat transfer liquid is used to transfer the heat from the storage mass to the liquid to be heated on a proportional mass basis. Chemical salts are used as heat storage material, which is heated by electrical heating elements. An oil or gas flame may also be used. A solenoid valve or a mechanical swing-type valve may be used to control the flow of the intermediate heat transfer liquid to the water. A thermostatic mixing valve is used to control the temperature of tap water serviced by the heater. Water is prevented from boiling by ensuring that the total heat available in the high temperature mass in contact with the water is less than the amount required to raise the temperature of the water above its boiling point.

Yansunaga (Japanese Patent No. JA 76911) discloses a radiator that contacts with and separates from a substrate by expansion and contraction of a vessel. The device uses a fluid, which, when heated, causes the pressure inside the vessel to rise, thereby stretching a bellows, which causes a radiator to press against a substrate, causing the heat from the apparatus to flow through the substrate and be radiated.

Sheppard et al. (U.S. Pat. No. 3,721,101) discloses a method and apparatus for cooling a load to a predetermined temperature level while the load remains isolated in a vacuum. It is disclosed that the thermal conductivity of a physical contact between two surfaces in a hard vacuum is a function of the true surface area of the contact, and therefore is a function of the yield strength of the contacting surfaces and the normal force between the contacting surfaces. A controllable heat flow is obtained by a compression of a spring, which causes an increase in the normal force between the pair of contacting surfaces thereby increasing thermal conductivity between the contacting surfaces.

Riordan (U.S. Pat. No. 3,225,820) discloses a device for controlling the temperature of electronic component packages by controlling the rate at which heat generated by the package is allowed to dissipate to a heat sink. The heat sink from a component package is transmitted through a gap in a gaseous or liquid medium with a bimetallic element being provided to vary the width of the gap, and therefore the thermal resistance between the heat source and the heat sink, in response to temperature changes in the heat sink. In another embodiment, a bimetallic element is fixed between the controlled body and a thermal conducting support which contacts the heat sink directly. The rate at which heat is dissipated from the controlled body is controlled by the area of contact between the body and the bimetallic element, which is in turn controlled by the temperature of the heat sink. As the temperature of the heat sink rises, the bimetallic element moves to increase the contact area with the controlled body, thereby lowering the thermal resistance.

Townsend (U.S. Pat. No. 3,390,717) discloses a heat transfer device and also a thermal switch which can be controlled to vary the heat transfer rate between facing plates. Thermal resistance, and thus heat transfer, between two sets of plates is dependent upon the area of contact of the plates and the force exerted between the areas of contact. A thermal switch exploiting this principle is described in which a sensing and actuation device moves a plate toward or away from another depending upon the temperature. The plates each have matching voids into which polished, thermally conducting balls are interposed to increase the area of effective thermal contact between the plates and thus reduce the thermal resistance when the plates are pressed together.

None of the above-mentioned references teach a heat mass in contact with a pipe, whereby heat is transferred to a fluid inside the pipe, and where the rate of transfer is controlled by the differential thermal expansion of the heat mass and the pipe. Neither is it taught to use the differential coefficient of expansion of a heat source and a pipe carrying a fluid to control the heating of a fluid within the pipe.

There is a need for a storage fluid heater capable of storing large mounts of heat during periods of inexpensive energy availability and recovering the stored heat with a passive controlled transfer of heat during periods of expensive energy availability.

SUMMARY OF THE INVENTION

The above-noted disadvantages of the prior art are overcome by the present invention, a storage heater for storing heat and subsequently heating a fluid.

The present invention comprises a heat storage unit having a plurality of circular, rectangular or other shaped adjacent blocks of a material having a relatively high thermal energy storage density, or heat capacity. Examples of such materials include cast iron and taconite. Each block is thermally coupled with its immediately adjacent blocks, although in some embodiments it may be desirable to have disjoint blocks. The number of blocks to make a storage water heater depends upon the amount of thermal energy to be stored for a particular application; more blocks can store more energy.

At least one heating element (such as an electric heating element) is thermally coupled to the heat storage unit. In one preferred embodiment, a hole is placed substantially through the centerline of the blocks into which the heating element is inserted. The heating element may pass substantially through the center of the heat storage unit. The heating element may be coupled to the storage unit in other ways, depending on the application.

At least one tubular hole is placed through the blocks through which at least one heat recovery tube is inserted. If multiple holes are used, they are preferably placed symmetrically about the centerline to ensure even heat distribution. The heat recovery tube is thermally coupled along an interface with the heat storage unit. The fluid to be heated passes through the tube, absorbing heat from the tube. Due to irregularities on the surface of the tube and on the inside surface of the hole in the blocks, gaps separate portions of the recovery tube from the heat storage blocks. The tube is made of a material having a coefficient of thermal expansion different from that of the heat storage unit so that as the temperature of the heat storage unit increases, the heat storage unit expands away from the tube. This differential expansion increases the surface area of the gaps, increasing the contact resistance of the interface. This process decreases the rate of heat transfer from the storage unit to the fluid in the tube. The theoretical foundation for this process is discussed in more detail in Appendix A, after the detailed description.

The material of the tube should be such that it can withstand severe thermal stress and such that it can resist cracking and erosion. Examples of such materials include stainless steel 304L, incoloy and monel. The specific material to be used in any particular application can be selected on the basis of the temperature to which the blocks are heated and the type of fluid being heated.

The heat recovery tube is tightly coupled to the hole at low temperatures, becoming less tightly coupled as temperature increases, thereby increasing contact resistance between the tube and the storage unit and reducing the rate of heat transfer from the storage unit to the recovery tube. For this reason, differential thermal expansion between the storage material and the tube is an essential parameter for the proper performance of the heater. Large differential thermal expansion is desired at higher block temperatures, whereas lower differential thermal expansion is desired at lower block temperatures. Large differential thermal expansion is responsible for a higher contact resistance, which is a desirable property in this storage apparatus since it prevents vaporization of the fluid when blocks are at high temperatures. At lower block temperatures, the differential thermal expansion should be relatively low so that better contact between the tube and the block storage material occurs, thereby resulting in enhanced heat transfer at these temperatures.

The length and number of tubes in the storage unit depend upon the contact resistance between the block storage material and the tubes. The greater the contact resistance, the greater the number of tubes required. Also, the type of application, such as residential water heating or commercial water heating, is an important factor in selecting the length and number of tubes. Ira plurality of tubes is used, they may be connected in parallel or in series, depending on the application. For commercial water heating applications, more storage blocks and longer tubes are used to provide a larger energy storage capacity. With the help of a computer program employing the equations given in Appendix A, the dimensions of a storage heater for a particular application can be optimized.

A fluid passes through the heat recovery tube to recover heat from the storage unit. In one embodiment, the heat recovery fluid is water. The temperature of the fluid kept less than a predetermined maximum temperature as a result of the controlled heat transfer. For residential applications, the maximum temperature is the boiling point of water. For steam generation applications, the maximum temperature is the temperature at which thermal stress affects the integrity of the heat recovery tubes.

The entire assembly of blocks that comprises a storage water heater must be properly insulated to prevent severe heat losses. Any type of insulation that can withstand the temperature of the storage unit may be used.

From the manufacturing point of view, the diameter of hole and the tube would be selected based on the contact resistance required. Generally very little force is required to fit the tube into the hole; it can be accomplished with a cold press. For applications requiring lower thermal contact resistance, such as steam generation, the tube and the hole dimensions may be very close. In such cases, greater force would be required to fit the tubes in the holes. One method of fitting the tubes would be to heat the storage block, insert the tube in the hole and allow the block to cool in order to achieve a shrink fit.

The storage heater is operated as follows: it is first charged by heating the storage material with an electric heating element, or multiple elements, to a temperature in the range of 600° C. to 700° C. A temperature controller is used to turn off the heating element when the desired charge temperature is reached. The rating of the heating element is selected based on the required charging period and expected heat losses. Once the storage unit is fully charged, it is then ready to be discharged.

Discharging of the storage water heater is achieved by passing the fluid through the tubes. An expansion tank at the inlet line is used to compensate for pressure rise in the system due to evaporation of water in the tubes when the water flow is shut off.

It is, therefore, an object of this invention to provide a storage fluid heater capable of storing large mounts of heat during periods of inexpensive energy availability and recovering the stored heat with a passive controlled transfer of heat during periods of expensive energy availability.

It is a further object of invention to provide a storage fluid heater capable of storing heat at a high temperature and transferring heat to a fluid while maintaining the fluid at a lower temperature.

These and other objects will become apparent from the following description of the preferred embodiment taken in conjunction with the following drawings, although variations and modifications may be effected without departing from the spirit and scope of the novel concepts of the disclosure.

DETAILED DESCRIPTION OF THE INVENTION

Figure 1:
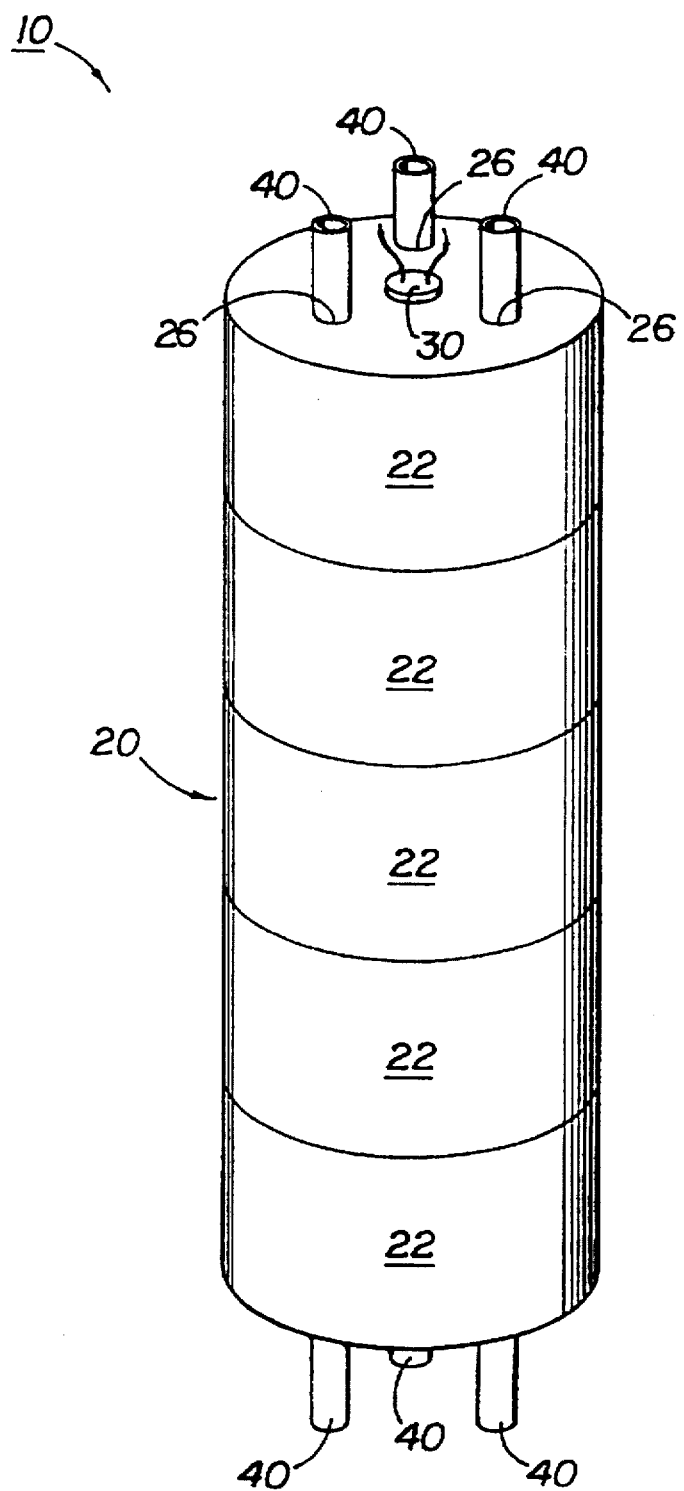
FIG. 1 is a top perspective view of the heating unit with a heating element and heat recovery tubes embedded in the heating unit of the preferred embodiment of the present invention.

The invention is now described in detail. Referring to the drawings, like numbers indicate like parts throughout the views.

In the preferred embodiment, as shown in FIG. 1, the present invention 10 comprises a heat storage unit 20 with at least one heating element 50 thermally coupled to the heat storage unit 20. At least one heat recovery tube 40 is thermally coupled with the heating unit 20. The storage unit 20 comprises a plurality of adjacent storage blocks 22 made of a material with a coefficient of thermal expansion such that at lower temperatures the storage blocks 22 are tightly coupled to the tube 40 and at higher temperatures the storage blocks 22 become less tightly coupled to the tube 40.

Figure 2:
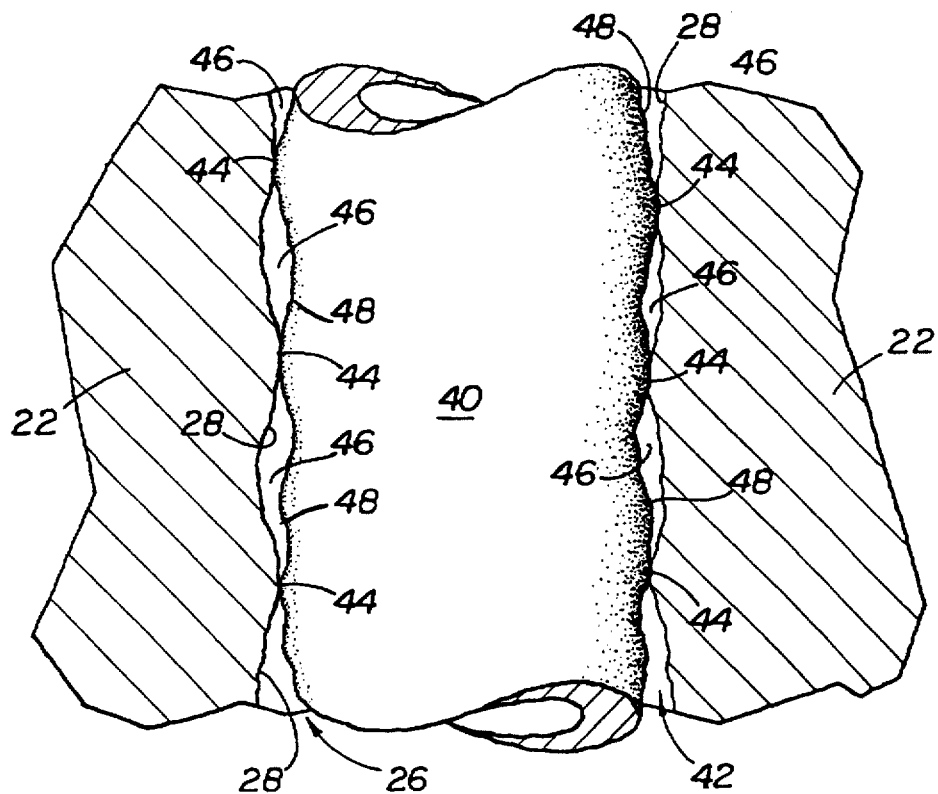
FIG. 2 is an enlarged sectional view of a portion of a heat recovery tube passing through a portion of the heat storage unit with exaggerated relief on the surfaces of the tube and the storage unit.

As shown in FIG. 2, the heat recovery tube 40 passes through a hole 26 in a storage block 22. The heat recovery tube 40 has an outer surface 48 and the hole 26 has an inner surface 28. This view shows exaggerated relief on the inner surface 28 and on the outer surface 44. Due to this relief, the heat recovery tube 40 and the storage block 22 are in thermal contact with each other at various contact points 44. The contact points 44, the outer surface 48 of the recovery tube 40 and the inner surface 28 of the hole 26 define a plurality of gaps 46 therebetween. In normal operation, the gaps 46 are microscopic in size. The gaps 46 in combination with the contact points 44 define an interface 42.

The heat recovery tube 40 comprises a material having a coefficient of thermal expansion such that as the average temperature of the storage block 22 near the interface 42 increases, the block 22 expands more than the tube 40, thereby enlarging the hole 26 and increasing the surface area of the gaps 46. This increases the contact resistance of the interface 42, which is a function of the surface area of the air gaps 46. As the contact resistance of the interface 42 increases, the rate of heat transfer from the storage block 22 to the recovery tube 40 decreases.

This process enables a controlled heat transfer from the storage block 22 to the heat recovery tube 40. As a fluid (e.g. water) passes through the heat recovery tube 40, heat is removed from the block 22, thereby decreasing the temperature of the storage block 22 near the interface 42. As a result, the block 22 contracts, thereby reducing the surface area of the gaps 46 and increasing the surface area of the contact points 44. The contact resistance of the interface 42 is reduced and the rate of heat transfer increases. Therefore, as the temperature of the storage block 22 decreases, heat passing from the storage block 22 to the recovery tube 40 meets less resistance.

The present invention ensures that the temperature of the moving fluid passing through the heat recovery tube 40 is kept less than a predetermined maximum temperature (e.g. the boiling point of water) as a result of the controlled heat transfer while the fluid is moving through the tube 40 at a predetermined mass flow rate. When the fluid flow is less than the predetermined mass flow rate, the temperature of the fluid may exceed the predetermined maximum. When the fluid is water and the mass flow rate approaches zero, the water in the tube 40 will absorb heat until it is transformed into steam. At this point the temperature of the steam in the tube 40 approaches the temperature of the storage block 22, the steam approaches thermal equilibrium with the storage block 22, and the rate of heat transfer from the storage block 22 to the tube 40 approaches zero.

When the storage unit block 22 is at its maximum temperature (i.e. immediately after the heating element 30 has heated the block 22) the contact resistance at the interface 42 is at a maximum. As the block 22 cools down, the contact resistance at the interface 42 decreases allowing the heat remaining in the block 22 to pass more easily into the heat recovery tubes 40. By selecting the proper materials and dimensions for the storage unit blocks 22 and the heat recovery tubes 40, the temperature of the moving fluid may be kept at or less than the desired maximum. The mathematical details for determining the contact resistance from which the heat flow may be calculated is provided in Appendix A.

Figure 3:
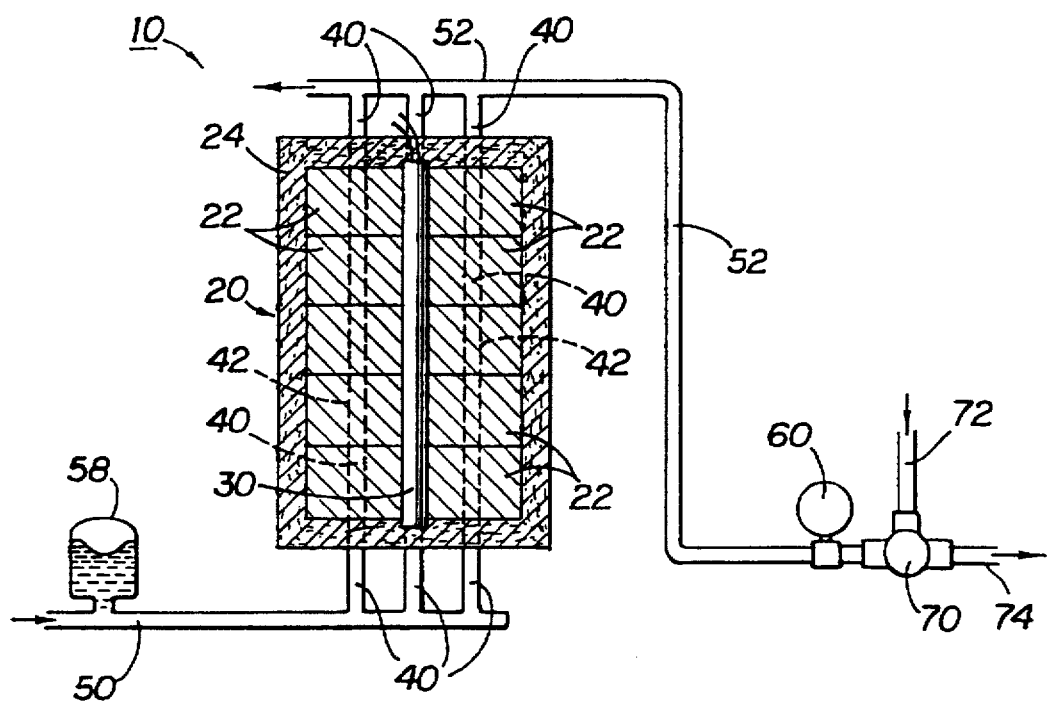
FIG. 3 is a schematic diagram of a preferred embodiment of the present invention configured as a storage water heater designed for use in residential applications.

In a one preferred embodiment, a typical storage water heater 10 recommended for residential applications is shown in FIG. 3. The heat storage unit 20 consists of five cast iron blocks 22, each 4 inches thick and each 7.75 inches in diameter. A ¾ inch diameter hole is drilled at the center of each cast iron block 22 to allow the insertion of a cartridge heating element 30. The cartridge heating element 30 is rated at 2640W and will heat the storage unit 20 to roughly 700° C. (1292° F.). Three holes are drilled into the storage blocks 22, equidistant from the center and 60° apart, to allow for the insertion of three stainless steel-304L heat recovery tubes 40, each having a ½ inch outside diameter. The five cast iron blocks 22 are stacked one on top of the other, giving the heat storage unit 20 a total height of 20 inches. This embodiment is designed to provide about 50 gallons of hot water at a temperature of about 125° F. under normal residential usage.

The storage unit 20 is insulated with a suitable high temperature insulation layer 24. Several types of common, commercially available insulation material may be used. These include, by way of example only, Microtherm (manufactured by Microtherm, Inc., Chicago, Ill.), BTU-block (manufactured by Schuller International, Inc., Denver, Colo.) and Mineral Wool and Foam Glass (manufactured by Pittsburg Corning Corp., Pittsburg, Pa.). If Microtherm is used, the layer 24 should be 4 in. thick. If BTU-block is used, the layer 24 should comprise 3 in. of BTU-block and 2.5 in. of Calcium Silicate. If Mineral Wool is used, the layer 24 should comprise 2 in. of mineral Wool and 5 in. of Foam Glass. It is also possible to insulate the storage unit 20 using a combination of vacuum insulation and radiation barriers.

The heat recovery tubes 40 are connected in a parallel configuration such that water enters at one end through a cold water inlet pipe 50 and leaves at the other end through a hot water outlet pipe 52. The temperature of the water at the cold water inlet 50 is the supply temperature of the available water. The temperature of the water at the hot water outlet 52 is maintained by the controlled heat transfer of the present invention 10 near the predetermined maximum.

An expansion tank 58 is connected to the inlet pipe 50 to relieve excess pressure in the system due to evaporation of water in the recovery tubes 40 when the flow rate is low or when the fluid flow is shut off. (in this embodiment the volume of the expansion tank 58 is approximately 2 gal.) Connected to the outlet pipe 52 is a pressure relief valve 60 used to vent off water when the water pressure exceeds a safe operating level (80 psi in this embodiment). A mixing valve 70 mixes the heated water from the hot water outlet 52 with cold water from a cold water inlet 72 to provide hot water at a safe temperature (125° F. in this embodiment) through a hot water service outlet 74.

The differential thermal expansion between the cast iron of the storage blocks 22 and the heat recovery tubes 40 is responsible for high contact resistance when the temperature of the storage unit 20 is high and low contact resistance when the temperature is low. For example, the coefficient of thermal expansion of cast iron is $6.7 \times 10^{-6}$ in/in °F. ($6.0 \times 10^{-6}$ in/in °F. for taconite) and the coefficient of thermal expansion for stainless steel tubing is $9.6 \times 10^{-6}$ in/in °F. When the storage unit 20 is heated to about 1100° F., the thermal expansion of the storage unit 20 is 0.00737 in./in. and that of the stainless steel tubes 40 (having an average temperature of 200° F.) is 0.00192 in./in. The difference between these two, the differential change, is 0.00737−0.00192=0.00545 in./in. When the temperature of the storage unit 20 drops to about 400° F., the expansion of storage unit 20 is 0.00268 in./in., while for stainless steel tubes 40 (which remain at 200° F.) it is 0.00192 in./in. Thus the differential change is 0.00268−0.00192=0.00076 in./in. Therefore, the differential change is greater at higher temperatures than at lower temperatures and at higher temperatures the storage blocks 22 expand away from the recovery tubes 40. This ensures that the there is greater separation between the storage blocks 22 and the heat recovery tubes 40, thereby increasing the contact resistance at the interface 42 when the temperature of the storage unit 20 is high.

The above describe embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

APPENDIX A

The contact resistance between two contacting surfaces (such as the outer surface of the heat recovery tube and the inner surface of the hole in the storage block) is a composite of two parallel resistances: one due to points where the two surfaces contact each other and the other due to gaps between the surfaces, which in most instances are air filled. If the contact area is small, as it is for rough surfaces, the major contribution to the resistance is made by the gaps. The contact resistance may be defined as $$R_c = (T_A - T_B)/Q$$

where $T_A$ and $T_B$ are temperature of the surfaces in contact with each other, and Q is the heat flow per unit length.

For the case of the contacting surfaces of a tube fitted in a cylindrical hole in a solid heat storage material, an approximate prediction of the contact resistance, $R_c$, can be obtained by assuming that the resistance is due only to the air gaps, $R_a$, modulated by a correction factor, $f$, which accounts for the contacting surface areas. Thus:

$$R_c = f \times R_a$$

where $f$=Correction factor $R_a$=Resistance due to air gap only, m-K/W

The resistance $R_a$ can be expressed by the following equation:

$$R_a = ln(D_t/D_h)/2\pi k_1$$

$$D_t = D_{t,0}[1 + \alpha_a \Delta T_t]$$

$$D_h = D_{h,o}[1 + \alpha_a \Delta T_h]$$

$D_{t,o}$=outer diameter of tube at room temperature, m $D_{h,o}$=Inner diameter of cylindrical hole in heat storage material at room temperature, m $k_a$=Thermal conductivity of air at mean air temperature, W/m K $\alpha_a$=Expansion coefficient of tube material, m/m°C.

$\alpha_s$=Expansion coefficient of heat storage material, m/m °C.

$\Delta T_a$=Temperature difference between tube surface and ambient, °C.

$\Delta T_b$=Temperature difference between heat storage material and ambient, °C.

And f is expressed by the equation:

$$f=(1+\gamma)k_a/(k_a+\gamma k_a)$$

where, $k_s$=Thermal conductivity of solid material $\gamma$=Ratio of contact area to non-contact area.

In the case of the storage Mater, the value of the ak-gap resistance depends on the inner hole diameter in the heat storage material, outside diameter of the tube, the coefficients of expansion of the tube and heat storage material, and water flow rate through the tube. Whereas correction factor f depends upon the ratio of contact area to non-contact area ($\gamma$). The value of $\gamma$ can be determined empirically by matching the experimental data matches close to the theoretical model.

Alternatively, the ratio of contact area to non-contact area y can be determined statistically. In general, the diameter of contacting tube and the drilled hole are normally distributed and described by the following probability density functions:

$$p_t(D_t) = \frac{1}{\sqrt{2\pi\sigma_t}} e^{-\frac{1}{2}(\frac{D_t-\mu_t}{\sigma_t})^2}$$

$$p_h(D_h) = \frac{1}{\sqrt{2\pi\sigma_h}} e^{-\frac{1}{2}(\frac{D_h-\mu_h}{\sigma_h})^2}$$

where $\mu_t$=mean tube diameter $\mu_h$=mean hole diameter $\sigma_t$=standard deviation of tube diameter $\sigma_h$=standard deviation of hole diameter $P_t$=probability density function of tube diameter $P_h$=probability density function of hole diameter $P(x)$=probability of x.

Local contact area will occur wherever the local robe dimension is larger than the hole dimension. The probability of having this contact can be found as follows:

For a given $D_t$ $$P(\text{contact}) = P(D_h < D_t) = \int_0^{D_h} p_h(D_h)dD_h.$$

For all $D_t$ $$P(\text{contact}) = \int_0^\infty p_t(D_t) \int_0^{D_t} p_h(D_h)dD_h dD_t.$$

The above equation can be solved numerically.

The area ratio, $\gamma$, is given by the probability ratio:

$$\gamma = \frac{A_{contact}}{A_{non-contact}} = \frac{P(\text{contact})}{P(\text{non-contact})} = \frac{P(\text{contact})}{1-P(\text{contact})}.$$

For a small difference between outside tube diameter and cylindrical hole diameter, the contact resistance will be low, and for a large difference, the contact resistance will be high. As the gap dimension decreases, area of the points of contact increases, decreasing the contact resistance and vice versa. As the difference between the tube diameter and the hole diameter increases, the contact resistance between the two also increases. This resistance also varies with the change in the temperature of the storage material. The contact resistance is high at higher temperatures and low at lower temperatures. Higher resistance at high temperature limits the formation of steam.

In one embodiment, using cast iron as the storage material and stainless steel as the tube material, it was experimentally observed that when the contact resistance was less than 0.03 mK/W, steam was generated in the heater upon initial operation. For the contact resistances higher than 0.17 mK/W, water was not heated high enough to be considered suitable for hot water applications. Therefore based on the experimental data and the approximate equation for determining the contact resistance, a contact resistance which falls in the range between 0.03 and 0.17 mK/W is satisfactory for the design of a storage water heater.

What is claimed is:

1. A storage fluid heater, comprising:
    a. a heat storage unit having an inner surface and comprising a material having a first predetermined coefficient of thermal expansion and a predetermined heat capacity, defining a first opening having a first width passing therethrough;
    b. a heating element thermally coupled to the heat storage unit for providing thermal energy to the heat storage unit; and
    c. a heat recovery robe having fluid outlet and an outer surface coupled to the inner surface of the heat storage unit, the heat recovery robe comprising a material having a second predetermined coefficient of thermal expansion, different from the first predetermined coefficient of thermal expansion, and having a second width, the second predetermined coefficient of thermal expansion and the second width selected so that as the average temperature of the heat storage unit near the heat recovery tube increases, the contact resistance between the heat storage unit and the heat recovery robe increases to limit the temperature of a fluid flowing within the heat recovery tube to a predetermined maximum, wherein control of heat transfer from the storage unit to the heat recovery tube is passive and effected by selection of the material of the heat storage unit and the material of the heat recovery tube.

2. The storage fluid heater of claim 1, wherein the outer surface of the heat recovery robe and the inner surface of the heat storage unit contact each other at a plurality of points, defining gaps therebetween.

3. The storage fluid heater of claim 2, wherein as the average temperature increases, the storage unit expands more than the recovery tube, increasing the surface area of the gaps, increasing the thermal contact resistance between the storage unit and the recovery tube and decreasing the rate of heat transfer from the storage unit to the recovery tube so that the temperature of the fluid is kept less than a predetermined maximum temperature.

4. The storage fluid heater of claim 1, wherein the heating element passes substantially through the center of the heat storage unit.

5. The storage fluid heater of claim 1, wherein the heat recovery tube passes through a tubular hole in the heat storage unit.

6. The storage fluid heater of claim 5, wherein the heat recovery tube is tightly fitted in the tubular hole at low temperatures and becomes less tightly coupled as temperature increases, thereby increasing contact resistance and reducing the rate of heat transfer.

7. The storage fluid heater of claim 5 comprising a plurality of heat recovery tubes passing through a corresponding plurality of tubular holes in the heat storage unit.

8. The storage fluid heater of claim 1, wherein the heat storage unit comprises a plurality of adjacent blocks, wherein each block is thermally coupled with its immediately adjacent blocks.

9. The storage fluid heater of claim 1, wherein the heat storage unit comprises cast iron blocks.

10. The storage fluid heater of claim 1, wherein the heating element is an electric heating element.

11. The storage fluid heater of claim 1, wherein the maximum temperature is the boiling point of water.

12. The storage fluid heater of claim 1, wherein the maximum temperature is below the temperature at which thermal stress affects the integrity of the heat recovery tube.

13. The storage fluid heater of claim 1, further comprising a means to relieve excess pressure when the flow of fluid through the tube is stopped.

14. The storage fluid heater of claim 1, further comprising an expansion tank in fluid communication with the fluid inlet of the tube that relieves excess pressure from the tube.

15. A storage heater for heating water, comprising:
 a. solid means for storing heat comprising a material having a first predetermined coefficient of thermal expansion;
 b. means for generating heat to be stored by the storage means, in thermal contact with the solid means for storing heat; and
 c. means for recovering heat from the means for storing heat, comprising a material having a second predetermined coefficient of thermal expansion, in thermal contact with the means for storing heat along an interface, whereby the interface has a thermal contact resistance that varies as a predetermined function of the first predetermined coefficient of thermal expansion, the second predetermined coefficient of thermal expansion, the temperature of the means for storing heat and the temperature of the recovering means so as to limit temperature of the water to a predetermined maximum whereby the rate at which heat is transferred from the storing means to the recovering means decreases with increasing temperature of the storing means and is effected by selection of the material of the heat storage unit and the material of the heat recovery robe and wherein control of the rate of heat transfer is passive.

16. The storage water heater of claim 15, wherein the storing means expands away from the recovering means as the temperature of the storing means increases.

17. The storage water heater of claim 16, wherein portions of the storing means are separated from the recovering means by a plurality of gaps, such that as the temperature of the storing means increases, the storing means expands more than the recovering means, thereby increasing the surface area of the gaps, thereby increasing the thermal resistance between the storing means and the recovering means.

18. A method for storing and recovering heat, comprising the steps of:
 a. heating a storage material having a predetermined heat capacity and a first predetermined coefficient of thermal expansion to a predetermined temperature; and
 b. passing a fluid through at least one tube, embedded in the storage material, having a second coefficient of thermal expansion, the first predetermined coefficient of thermal expansion and the second coefficient of thermal expansion selected so that as temperature increases, the storage material expands away from the tube, increasing contact resistance between the tube and the storage material, reducing the rate of heat transfer, thereby maintaining the temperature of the fluid below a predetermined maximum.

* * * * *